(12) United States Patent
Griese (10) Patent No.: US 9,173,429 B2
(45) Date of Patent: Nov. 3, 2015

(54) METHOD FOR PRODUCING CLEAR AND SOLUBLE CEREAL-BASED EXTRACT

(75) Inventor: Bernhard Griese, Skælskør (DK)

(73) Assignee: HARBOES BRYGGERI A/S, Skaelskoer (DK)

( * ) Notice: Subject to any disclaimer, the term of this patent is extended or adjusted under 35 U.S.C. 154(b) by 0 days.

(21) Appl. No.: 12/999,216

(22) PCT Filed: Feb. 12, 2010

(86) PCT No.: PCT/EP2010/051790
§ 371 (c)(1),
(2), (4) Date: Dec. 15, 2010

(87) PCT Pub. No.: WO2010/092149
PCT Pub. Date: Sep. 19, 2010

(65) Prior Publication Data
US 2011/0117239 A1    May 19, 2011

(30) Foreign Application Priority Data
Feb. 13, 2009    (DK) .................. 2009 00212

(51) Int. Cl.
| A23L 2/38 | (2006.01) |
| A23L 2/70 | (2006.01) |
| A23L 2/78 | (2006.01) |
| A23L 2/80 | (2006.01) |
| A23L 2/82 | (2006.01) |
| C12C 7/20 | (2006.01) |
| C12C 7/26 | (2006.01) |
| C12C 7/28 | (2006.01) |

(52) U.S. Cl.
CPC ... *A23L 2/38* (2013.01); *A23L 2/70* (2013.01); *A23L 2/78* (2013.01); *A23L 2/80* (2013.01); *A23L 2/82* (2013.01); *C12C 7/20* (2013.01); *C12C 7/26* (2013.01); *C12C 7/28* (2013.01); *C12C 7/282* (2013.01)

(58) Field of Classification Search
CPC ............ C12C 7/26; C12C 7/28; C12C 7/282; C12C 7/20; A23L 2/38; A23L 2/78; A23L 2/80; A23L 2/70; A23L 2/82
USPC ................................ 426/16, 18, 29, 490, 495
See application file for complete search history.

(56) References Cited

U.S. PATENT DOCUMENTS

| 2,919,193 | A |   | 12/1959 | Berntsson et al. |   |
| 3,378,374 | A | * | 4/1968  | Williamson et al. | 426/492 |
| 4,244,984 | A | * | 1/1981  | Regling | 426/599 |
| 2004/0105924 | A1 | * | 6/2004 | Sanders | 426/495 |
| 2004/0170726 | A1 |   | 9/2004 | Triantafyllou |   |
| 2009/0022847 | A1 | * | 1/2009 | Kimura et al. | 426/11 |

FOREIGN PATENT DOCUMENTS

| CA | 325884 A | 9/1932 |
| CN | 1434111 A | 8/2003 |
| EP | 0088397 A2 | 9/1983 |
| EP | 0620272 A2 | 10/1994 |
| GB | 826862 A | 1/1960 |
| GB | 854455 A | 11/1960 |
| GB | 2288608 A | 10/1995 |
| WO | 01/43566 A1 | 6/2001 |
| WO | 02/057403 A1 | 7/2002 |
| WO | 02/102960 A1 | 12/2002 |
| WO | 2005/070234 A1 | 8/2005 |
| WO | 2005/113738 A1 | 12/2005 |
| WO | 2005/117616 A2 | 12/2005 |
| WO | 2008/024657 A2 | 2/2008 |
| WO | 2008/083718 A1 | 7/2008 |

\* cited by examiner

*Primary Examiner* — Vera Stulii
(74) *Attorney, Agent, or Firm* — McDermott Will & Emery LLP (57) ABSTRACT

A method for producing a concentrated cereal-based extract for the production of food products, in particular clear and haze-free cereal-based beverages.

19 Claims, 2 Drawing Sheets

METHOD FOR PRODUCING CLEAR AND SOLUBLE CEREAL-BASED EXTRACT

CROSS REFERENCE TO PRIOR APPLICATIONS

This application is a U.S. National Phase application under 35 U.S.C. §371 of International Application No. PCT/EP2010/051790, filed on Feb. 12, 2010 and claims benefit of priority to Danish Patent Application No. PA 2009 00212, filed on Feb. 13, 2009. The International Application was published in English on Aug. 19, 2010 as WO 2010/092149 A1 under PCT Article 21(2). All of these applications are herein incorporated by reference.

TECHNICAL FIELD

The present invention relates to a method for producing a cereal-based extract for the production of food products, and in particular for the production of clear and haze-free cereal-based beverages.

BACKGROUND OF THE INVENTION

Cereal-based beverages are expected to grow as a category in the coming years. In the Middle East there is especially a potential since there is limit to consumption of alcoholic beverages and the cereal-based drink is marketed as non-alcoholic. In the Western market there is also a potential since the cereal-based beverage is a healthier alternative to the conventional soft drink and alcoholic beverage.

Beverages, in particular alcoholic fermented beverages, for example wine and beer, often have a tendency to be hazy which can be of biological or physico-chemical origin. Haze (or turbidity) is undesirable because hazy beverages are viewed as being less appealing than clear beverages. Furthermore, some consumers may believe that the haziness is a sign of microbiological spoilage.

Cereal extracts, such as malt extracts, are frequently used in the food and beverage industry. Cereal extracts for the food industry are typically used as food additives (e.g. sugar replacement, fillers, flavour enhancers, colouring agents and baking agents) and as base compound for the production of beverages such as non alcoholic beer, non-fermented beverages and soft drinks. Cereal extracts can be prepared from both malted and un-malted cereals. Cereal extracts prepared from malted cereal are typically produced by a process in which malted cereal is grounded, mixed with hot water in a mash tun or mashing kettle for saccharification, filtered to obtain a wort, and finally concentrated by evaporation and/or drying to increase the dry matter content and obtain the cereal extract, e.g. in the form of a syrup, a granulate or a powder.

However, when presently available cereal extracts are used in the preparation of e.g. non-fermented beverages, such beverages have to be filtrated or otherwise purified in order to avoid haze formation in the final product. Hence, if not filtrated, such beverages prepared from the presently known cereal extracts are less appealing than clear beverages, and the necessary purification steps constitute costly and major disadvantages.

A number of methods for producing cereal extracts are known, i.a. from WO0143566 which describes how to produce a water-soluble bean-based extract including one or more isoflavone glycosides. Also disclosed is a method of preparing such a water-soluble bean-based extract.

WO2008024657A describes a method of making a haze-free non-alcoholic malt beverage which includes forming a malt solution containing a coagulant and water, adjusting the pH of the malt solution so that the pH of the malt solution is less than about 4.0 and coagulating the protein from the malt extract in the malt solution. The coagulated protein from the malt solution is removed to form a haze-free malt beverage.

CA 325884 describes a process and apparatus for producing malt extract and malt beverages, i.a. including the use of centrifugally removing the resulting liquor from the residual grains to obtain a substantially clear malt extract syrup.

US2004/0170726 describes a process for the production of a cereal beer made from cereal, and products prepared from the process.

WO2005117616 describes a method of preventing or reducing haze in a beverage using silane-treated silica filter media.

WO02/057403 describes stabilisation of beverages against haze formation.

WOGB2288608 describes treatment with PVPP to remove unwanted trace materials.

WO2005070234 describes a process for the production of sediment free clarified fruit juices.

However, there is still a need for improved methods for producing concentrated cereal extracts which are readily soluble in water and which can be used as an ingredient in the production of clear and haze-free beverages. It is therefore an object of the present invention to provide a method which is capable of overcoming the above obstacles.

It has now been found that it is possible to obtain readily soluble concentrated cereal-based extracts which provides for the preparation of clear and haze free beverages, by subjecting a wort to a number of consecutive processing steps, including i.a. a heat treatment step and a cold stabilisation step before concentration followed by filtration.

SUMMARY OF THE INVENTION

Accordingly, the present invention pertains to a method for producing cereal-based extracts which are particularly useful for the production of clear and haze-free beverages.

In one aspect, the method comprises the steps of: subjecting a wort to a heat treatment with a stabilisation agent; subjecting the heat-treated wort to a cold stabilisation step, wherein the wort is chilled and the solids from said chilled wort are separated to obtain a clarified wort; subjecting the clarified wort to a concentration step, wherein the dry matter content of the wort is increased to obtain a concentrate; and subjecting the concentrate to a hot filtration step to obtain the concentrated cereal-based extract.

In a further aspect, the method comprises the steps of: subjecting a wort to a heat treatment with a stabilisation agent; optionally adjusting the pH of the heat-treated wort; subjecting the heat-treated wort to a chilling step; subjecting the chilled wort to centrifugation and/or filtration; optionally subjecting the resulting wort to a second chilling step; treating the chilled wort with a stabilisation agent; subjecting the resulting chilled wort to a clarification step separating the solids from said chilled wort by sedimentation; removing the sedimented material to obtain a clarified wort; treating the clarified wort by centrifugation and/or filtration, optionally with a filtration agent; subjecting the resulting wort to a concentration step, wherein the dry matter content of wort is increased and collecting the resulting concentrate; subjecting the concentrate to a hot filtration step to obtain the concentrated cereal-based extract.

In a further aspect, the method comprises the steps of: subjecting a wort to a heat treatment with a stabilisation agent; optionally adjusting the pH of the heat-treated wort; subjecting the heat-treated wort to a chilling step; subjecting the chilled wort to centrifugation and/or filtration; subjecting the resulting chilled wort to a clarification step separating the solids from said chilled wort by ultrafiltration; subjecting the ultrafiltrated wort to one or more ion-exchange steps; subjecting the resulting wort to a concentration step, wherein the dry matter content of wort is increased and collecting the resulting concentrate; optionally adjusting the concentrate for sweetness by enzyme treatment; subjecting the concentrate to a hot filtration step to obtain the concentrated cereal-based extract.

In a further aspect, the method comprises the steps of providing a milled cereal material; suspending the milled cereal in an aqueous liquid and making an aqueous extraction (mashing); separating the solids and the wort (aqueous-phase) of the resulting suspension; collecting the wort (aqueous-phase); subjecting the wort to a heat treatment with a stabilisation agent; subjecting the heat-treated wort (aqueous-phase) to a chilling step; treating the chilled wort (aqueous-phase) with a stabilisation agent; subjecting the resulting chilled wort (aqueous-phase) to a clarification step separating the solids from said chilled wort (aqueous-phase); subjecting the resulting wort (aqueous-phase) to a concentration step, wherein the dry matter content of wort (aqueous-phase) is increased; collecting the resulting liquid to obtain a concentrate and finally subjecting the concentrate to a hot filtration step to obtain the concentrated cereal-based extract.

The invention further relates to a cereal-based extract prepared by a method according to the invention, and to food products, including beverages, comprising such cereal-based extract.

DETAILED DESCRIPTION OF THE INVENTION

As mentioned above the present invention relates to a method for producing a cereal-based extract for food products, and which is particularly useful for producing clear and haze-free beverages.

In one aspect, the method comprises the steps of: subjecting a wort to a heat treatment with a stabilisation agent; subjecting the heat-treated wort to a cold stabilisation step, wherein the wort is chilled and the solids from said chilled wort are separated to obtain a clarified wort; subjecting the clarified wort to a concentration step, wherein the dry matter content of the wort is increased to obtain a concentrate; and subjecting the concentrate to a hot filtration step to obtain the concentrated cereal-based extract.

Some embodiments according to the invention are illustrated in the following:

In one aspect, a method of producing a concentrated cereal-based extract comprising the steps of:
subjecting a wort to a heat treatment with a stabilisation agent;
optionally adjusting the pH of the heat-treated wort;
subjecting the heat-treated wort to a chilling step;
subjecting the chilled wort to centrifugation and/or filtration;
optionally subjecting the resulting wort to a second chilling step;
a) treating the chilled wort with a stabilisation agent, subjecting the resulting chilled wort to a clarification step separating the solids from said chilled wort by sedimentation, removing the sedimented material to obtain a clarified wort, and treating the clarified wort by centrifugation and/or filtration, optionally with a filtration agent;
or b) subjecting the resulting chilled wort to a clarification step separating the solids from said chilled wort by ultrafiltration;
subjecting the resulting wort to a concentration step, wherein the dry matter content of wort is increased and collecting the resulting concentrate;
subjecting the concentrate to a hot filtration step to obtain the concentrated cereal-based extract, is provided.

In one aspect, a method of producing a concentrated cereal-based extract comprising the steps of:
subjecting a wort to a heat treatment with a stabilisation agent;
optionally adjusting the pH of the heat-treated wort;
subjecting the heat-treated wort to a chilling step;
subjecting the chilled wort to centrifugation and/or filtration;

optionally subjecting the resulting wort to a second chilling step;
treating the chilled wort with a stabilisation agent;
subjecting the resulting chilled wort to a clarification step separating the solids from said chilled wort by sedimentation;
removing the sedimented material to obtain a clarified wort;
treating the clarified wort by centrifugation and/or filtration, optionally with a filtration agent;
subjecting the resulting wort to a concentration step, wherein the dry matter content of wort is increased and collecting the resulting concentrate;
subjecting the concentrate to a hot filtration step to obtain the concentrated cereal-based extract, is provided.

Some embodiments according to the invention are illustrated in the following:

In a further aspect, a method of producing a concentrated cereal-based extract comprising the steps of:
subjecting a wort to a heat treatment with a stabilisation agent;
optionally adjusting the pH of the heat-treated wort;
subjecting the heat-treated wort to a chilling step;
subjecting the chilled wort to centrifugation and/or filtration;
subjecting the resulting chilled wort to a clarification step separating the solids from said chilled wort by ultrafiltration;
subjecting the ultrafiltrated wort to one or more ion-exchange steps;
subjecting the resulting wort to a concentration step, wherein the dry matter content of wort is increased and collecting the resulting concentrate;
optionally adjusting the concentrate for sweetness by enzyme treatment;
subjecting the concentrate to a hot filtration step to obtain the concentrated cereal-based extract, is provided.

In one aspect, the present invention provides a method for producing a cereal-based extract comprising the following steps of:
(a) providing a milled cereal material;
(b) suspending the milled cereal in an aqueous liquid and making an aqueous extraction (mashing);
(c) separating the solids and the aqueous-phase of the resulting suspension (wort);
(d) collecting the aqueous-phase (wort), and optionally treating the wort with one or more proteolytic enzymes and further subjecting the wort to a heat treatment and a stabilisation agent;
(e) subjecting the aqueous-phase (wort) to a chilling step;
(f) treating the chilled aqueous-phase (wort) with a stabilisation agent;
(g) subjecting the resulting chilled aqueous-phase (wort) to a clarification step separating the solids from said chilled aqueous-phase (wort);
(h) subjecting the resulting aqueous-phase (wort) to a concentration step, wherein the dry matter content of aqueous-phase (wort) is increased; and
(i) collecting the resulting liquid to obtain the cereal-based extract.

In the present context, the term "wort" relates to a liquid extracted from a mashing process of a cereal material e.g. as during the brewing of beer or whisky. Wort contains the sugars that can be fermented by the brewing yeast to produce alcohol. Wort is normally produced from malted barley with supplementary grains such as barley, corn, sorghum, rye or wheat. The term "wort" and "aqueous-phase" is used interchangeably herein.

In the present context, the term "concentrate" refers to a wort wherein the dry matter of the wort has been increased for example by vacuum evaporation or by another suitable method to a concentrate which depending on the desired amount of the dry matter in the concentrate may be in the form of a syrup.

As described the cereal-based extract is prepared by in a first step subjecting the wort to heat-treatment with a stabilisation agent.

It was found by the inventors, that in useful embodiments the clarification by cold stabilisation such as by sedimentation or ultrafiltration be combined with a heat-treatment step whereby the clarity of products prepared from the final concentrated cereal-based extract may be further improved. Thus, in accordance with the invention the process comprises a heat treatment of the wort (aqueous-phase), and a step wherein the heated wort (aqueous-phase) is treated with a stabilisation agent, e.g. a stabilisation agent as described in the following. In one aspect, the heat treatment is conducted in the presence of one or more stabilisation agents, i.e. a stabilisation agent which is capable of absorbing haze-forming compounds such as proteins, tannoids, flavanols and monomeric and polymeric polyphenols. In preferred embodiments the stabilisation agent(s) are selected from silica gel preparations such as hydrogels and xerogels, silicasol, polyvinylpolypyrrolidone (PVPP), bentonite, gelatine, isinglass, carrageenan and mixtures thereof.

Preferably, the heat treatment comprises increasing the temperature of the wort (aqueous-phase) to at least about 60 deg. C., such as at least about 70 deg. C., such as at least about 80 deg. C., such as at least about 90 deg. C., such as at least about 100 deg. C., such as at least about 110 deg. C., such as at least about 120 deg. C., such as at least about 130 deg. C., including at least about 140 deg. C. In one aspect, the heat treatment comprises increasing the temperature of the wort (aqueous-phase) to at least 60 deg. C., such as at least 70 deg. C., such as at least 80 deg. C., such as at least 90 deg. C., such as at least 100 deg. C., such as at least 110 deg. C., such as at least 120 deg. C., such as at least 130 deg. C., including at least 140 deg. C. In useful embodiments the heat treatment is conducted for a time period in the range of about 1-120 minutes. In another embodiment, the heat treatment is conducted for a time period in the range of about 30-90 minutes. In another embodiment, the heat treatment is conducted for a time period in the range of 1-120 minutes. In another embodiment, the heat treatment is conducted for a time period in the range of 40-90 minutes. In another embodiment, the heat treatment is conducted for a time period in the range of 50-90 minutes. In useful embodiments the heat treatment is conducted for a time period in the range of about 1-120 minutes at a temperature of at least about 90 deg. C. such as from at least about 95 deg. C. to 100 deg. C. In another embodiment, the heat treatment is conducted for a time period in the range of about 30-90 minutes at a temperature of at least 90 deg. C. such as from 95 deg. C. to 100 deg. C. In another embodiment, the heat treatment is conducted for a time period in the range of about 40-90 minutes at a temperature of at least 90 deg. C. such as from at least 95 deg. C. to 100 deg. C. In another embodiment, the heat treatment is conducted for a time period in the range of about 50-90 minutes at a temperature of at least 90 deg. C. such as from at least 95 deg. C. to 100 deg. C. The stabilisation agent may be added before the heating or after a period of heating such as after 20 minutes, such as after 10 minutes or such as after 5 minutes.

After the above mentioned heat treatment step, the following step of the process according to the invention is a cold stabilisation step in which the wort optionally with a stabilisation agent is treated at a low temperature.

Cold-stabilisation is e.g. known from the production of beer, where fermented beer is brought in contact with stabilisation agents, whereby the components causing haze in the beer are adsorbed and removed by the stabilisation agent.

The most frequent cause of haze in fermented beverages is protein-polyphenol interaction. Fermented cereal-based beverages like beer have a natural content of both polyphenols and protein. The total protein content of the cereal is an important factor as this is broken down during mashing and haze precursors can be formed. Proteins with regions rich in the amino acid proline are defined as haze proteins since polyphenols can attach to this amino acid. Polyphenols come from the husk of the cereal and will be extracted during mashing. Polyphenolic materials found in beer can be categorized into three types dependant upon the degree of oxidation and polymerization: Catechin (monomer), Flavonoids (dimer) and Tannoid (polymer). Flavonoids present in beer do not cause haze since the molecular weight of polyphenol protein agglomerates are sufficiently low that they stay in solution. During aging of beer the flavonoids are oxidised which continue to polymerize and become tannoids which will give haze to the product. The molecular weight of tannoids protein agglomerates is >60.000 Daltons and insoluble in beer at ambient temperature and give rise to permanent haze. Several factors affect the speed of polyphenol polymerization and thereby the haze formation, including Polyphenol concentration, haze protein, oxygen, temperature (heat will accelerate the oxidation/polymerization), carbohydrates, Metal ions (Cu and Fe are e.g. involved in oxidation of flavonoids to tannoids), and light. The polymerization of flavonoids to tannoids give rise to reduced shelf life of beverages filled in final packaging.

Accordingly, a number of filtration methods and stabilisation agents have been developed in order to remove the haze forming substances from fermented beverages. Thus, it is e.g. known to use stabilising agents such as silica gel with high adsorptive capacity for the removal of proteins and cross-linked polyvinylpyrrolidone (PVPP), Polyclar, for the removal of tannoids, flavanols and monomeric and polymeric polyphenols e.g. from beer.

However, according to the inventor's knowledge, cold stabilisation has not previously been described in the production of concentrated cereal-based extracts. As will be apparent from the following examples, it was unexpectedly found that the use of a cold-stabilisation step in the production of cereal-based extracts had a remarkable impact on haze formation in the final beverages products prepared from such cereal-based extracts. As will be apparent from the accompanying examples, final beverage products based on cereal extracts prepared according to the method of the invention had remarkably low turbidity values.

Before the cold stabilisation step (or as a first step in the cold stabilisation) the wort may be subjected to a separation step such as centrifugation or filtration. In one embodiment, the wort is chilled to a temperature in the range of about −2 to 15 deg before the separation step. In one embodiment, the separation is by centrifugation.

In one aspect, the cold stabilisation comprises that the chilled wort is subjected to a clarification step selected from filtration such as ultrafiltration, centrifugation and sedimentation.

In one aspect, in the cold-stabilisation step of the process according to the invention, the wort (aqueous-phase) is treated with a stabilisation agent which is capable of absorbing haze-forming compounds, in particular compounds with a positive charge such as proteins, tannoids, flavanols and monomeric and polymeric polyphenols. In preferred embodiments the stabilisation agents are selected from silica gel preparations such as hydrogels and xerogels, silicasol, polyvinylpolypyrrolidone (PVPP), bentonite, gelatine, isinglass, carrageenan, enzymes and mixtures thereof.

In one aspect, the cold stabilisation step comprises the following steps: subjecting the wort to a chilling step; treating the chilled wort with a stabilisation agent; subjecting the resulting chilled wort to a clarification step separating the solids from said chilled wort by sedimentation optionally followed by centrifugation and/or filtration. In another aspect, the cold stabilisation step comprises the following steps: subjecting the wort to a chilling step; subjecting the chilled wort to centrifugation and/or filtration; optionally subjecting the resulting wort to a second chilling step; treating the chilled wort with a stabilisation agent; subjecting the resulting chilled wort to a clarification step separating the solids from said chilled wort by sedimentation. In another aspect, the cold stabilisation step comprises the following steps: subjecting the wort to a chilling step such as to a temperature of <15° C., such as <10° C.; subjecting the chilled wort to centrifugation and/or filtration; subjecting the wort to a chilling step such as to a temperature of <10° C., such as <5° C. for sedimentering; treating the chilled wort with a stabilisation agent; subjecting the resulting chilled wort to a clarification step separating the solids from said chilled wort by sedimentation optionally followed by centrifugation and/or filtration. The stabilisation agent may be added before beginning of the sedimentation process or added after reaching the specified temperature. In one aspect, the sedimented material is removed after the sedimentation process to obtain a clarified wort. In a further aspect, the clarified wort is further treated by filtration, optionally with the use of a filtration agent as described below.

In one aspect, the cold stabilisation step comprises the following steps: subjecting the wort to a chilling step; subjecting the resulting chilled wort to a clarification step separating the solids from said chilled wort by ultrafiltration. In one aspect, the wort is chilled to a temperature in the range of about −2 to 10 deg. C. In a further aspect, the cold stabilisation step comprises the following steps: subjecting the wort to a chilling step such as to a temperature of <15° C. such as <10° C.; subjecting the resulting chilled wort to a clarification step separating the solids from said chilled wort by ultrafiltration. In one aspect, the wort before ultrafiltration is pre-treated by centrifugation and/or filtration.

In one aspect, the cold stabilisation step is conducted at a low temperature, wherein the wort (aqueous-phase) optionally treated with a stabilisation agent is chilled to a temperature in the range of about −2 to 15 deg. C., including the range of −2 to 5 deg. C., including the range of −2 to 0 deg. C., such as the range of 0 to 2 deg. C., such as the range of 2 to 4 deg. C., such as the range of 4 to 6 deg. C., including the range of such as the range of 6 to 8 deg. C., such as the range of 8 to 10 deg. C., such as the range of 10 to 12 deg. C., including the range of 12 to 15 deg. C. In one aspect, the cold stabilisation step is conducted at a low temperature, wherein the wort (aqueous-phase) treated with a stabilisation agent is chilled to a temperature in the range of about −2 to 5 deg. C.

As a next step, the resulting chilled wort (aqueous-phase) is subjected to a clarification step in which the absorbed haze-forming compounds are removed from the wort (aqueous phase). This may be done by any suitable procedure or procedures or combinations thereof, including, for example, by settling out (using a sedimentation step) the absorbed haze-forming compounds and decanting the solution, optionally followed by a filtration step. The absorbed haze-forming compounds may be removed by a physical process, which may be by filtration or centrifugation, for example. Alternatively, the absorbed haze-forming compounds may be removed by a chemical process, such as ion exchange resins, for example. In another aspect, the clarification is a combination of a sedimentation step and a filtration step, optionally using a filtration agent. Examples of filtration agents are for example polyvinylpyrrolidone (PVPP) (such as Polyclar). The filtration media used may for example be kieselgur.

In one aspect, the wort is centrifugated before a sedimentation step and thereafter subjected to filtration such as by the use of kieselgur.

In a preferred embodiment the sedimentation step is conducted by storing the chilled wort (aqueous-phase) for a time period of at least about 12 hours, including at least 1 day, 2 days, 3 days, 4 days or 5 days.

In another aspect, the clarification step is an ultrafiltration step. The wort is optionally centrifugated and/or filtrated before the ultrafiltration step. In one aspect, the wort is centrifugated before the ultrafiltration step.

In the present context, the term "ultrafiltration" (UF) refers to a membrane filtration in which pressure is the driving force and the liquid is pressed against a semipermeable membrane. Suspended solids and solutes of high molecular weight are retained, while water and low molecular weight solutes pass through the membrane. This separation process is used in industry and research for purifying and concentrating macromolecular (such as $10^3$-$10^6$ Da) solutions, especially protein solutions. In a preferred aspect, the ultrafiltration is performed by at low temperature (<10° C.) and in tubular ceramic filter membranes.

In one aspect, the heat-treated wort is subjected to a chilling step before the ultrafiltration such as by chilling the wort to a temperature of lower than 10° C. In one aspect, the wort is chilled to a temperature in the range of about −2 to 10 deg. C.

Before chilling the wort, the pH of the wort may be adjusted to a pH of 4.0 to 9.0 depending on the further treatment of the wort and the final use. In one aspect, the pH is adjusted to a pH of 7.0 to 8.0. This may be suitable if the wort is to be treated with an enzyme for adjusting the sweetness. In one aspect, the pH of the heat treated wort is adjusted and the content of calcium is adjusted before cold stabilisation. In one aspect, the pH is adjusted by adding CaO to a pH of 7.0 to 8.0. The adjustment of pH with CaO may decrease the calcium content of the wort by precipitation and may in some embodiments be useful in order to standardize the mineral content. In another aspect, the pH of the wort is adjusted to a pH of 4.0 to 6.0 by addition of for example phosphoric acid.

In one aspect, the wort is treated by ion-exchange after cold stabilisation and before the concentration step. In one aspect, the ion-exchange is an anion-exchange or a combination of an anion-exchange and a cation exchange. In a preferred aspect, the ion-exchange is performed by mixed bed of anion and cation exchange. First the mineral content of the wort is standardized hereunder especially the calcium content is reduced by exchanging calcium with sodium. In the second step the colour giving components are removed.

As a next step the wort (aqueous-phase) is concentrated to a dry matter content of at least 30% by weight; such as 40% by weight; such as 50% by weight; such as at least 60% by weight; such as at least 70% by weight; including at least 80% by weight. This may be done by any suitable concentration method such as evaporation (e.g. vacuum evaporation) or drying. In one aspect, the wort is concentrated by vacuum evaporation. In a further aspect, the wort is concentrated by vacuum evaporation which vacuum evaporation is followed by drying to obtain a powder.

In a further embodiment, the process according to the invention additionally comprises subjecting the resulting concentrated cereal-based extract to a further clarification step in order to remove impurities and haze forming components which may have been formed during the concentration step. This clarification step may be conducted using any suitable method, such as the methods described above. In presently preferred embodiments the further clarification step is conducted by a process selected from filtration such as microfiltration, ultrafiltration, centrifugation and sedimentation. In one aspect, the filtration is a microfiltration or kieselgur filtration. In a further aspect, the filtration is a kieselgur filtration. When using filtration as the clarification step, it may be advantageous to conduct the filtration as a hot filtration step, as the sugar content of the resulting cereal-based extract of the concentration step may be relatively high, and therefore viscous at low temperatures. Hence, the hot filtration step is preferably conducted at an elevated temperature such as in the range of about 30-90° C., such as in the range of 60-80° C.

Thus in a presently preferred embodiment the further clarification step is conducted by hot filtration. In one aspect, the hot filtration is a microfiltration or kieselgur filtration. In a further aspect, the hot filtration is a kieselgur filtration.

As previously mentioned, the cereal-based extract obtainable using the process according to the invention has remarkably good properties with regard to haze formation. Standard methods for measuring clarity (also referred to as haze or turbidity) are well-known in the art, and are commonly the same no matter which turbidimeter design is being used. Turbidity is generally determined by the optical measurement of scattered light resulting from the interaction of incident light with particulate material in a liquid sample.

One of the methods for measuring turbidity is the nephelometric method, in which turbidity is measured using white light at 860 nm and a 90° detection angle. A frequently used unit for turbidity is the EBC value (EBC=European Brewery Convention). An EBC value of up to about 2 corresponds to a very slight haze whereas EBC values of about 2 up to 8 EBC, is very hazy. Other available methods for measuring turbidity may be applied in accordance with the invention, including the use of methods for determining Formazin Turbidity Units (FTU) and Formazin Nephelometric units (FNU).

In the present context, the clarity of the resulting cereal-based extract is preferably less than 2.0 EBC, including less than 1.9 EBC, including less than 1.8 EBC, including less than 1.7 EBC, including less than 1.6 EBC, including less than 1.5 EBC, including less than 1.4 EBC, including less than 1.3 EBC, including less than 1.2 EBC, including less than 1.1 EBC, including less than 1.0 EBC when measured at a 90° scatter light photometer at 860 nm in a 7° brix solution. In the present context degrees Brix (° Bx) have the general meaning used in the art, i.e. it is a measurement of the dissolved sugar-to-water mass ratio of a liquid, hence a 7° Bx solution is 7% (w/w), with 7 grams of sugar per 100 grams of solution.

The process according to the invention may further comprise a step wherein the resulting cereal-based extract is subjected to a further concentration step.

In particular, the cereal extract may be concentrated to a brix of about 65 to 85° Bx to form a concentrate which can be dried to form a dry mix for later reconstitution (e.g. a beverage mix). Further ingredients can be added to the cereal extract as desired, including e.g. flavours, preservatives, colorants, foaming agents, anti-foaming agents, hydrocolloids, polysaccharides, juices, antioxidants, caffeine, coffee solids, tea solids, herbs, nutraceutical compounds, electrolytes, vitamins, minerals, amino acids and emulsifiers.

In one aspect, the sweetness of the concentrated cereal-based extract may be adjusted by adding one or more enzymes. This may be performed by adding an enzyme after the concentration step. Before addition the pH may be adjusted depending of the enzyme used and the pH of the concentrated cereal-based extract for example by addition of CaO and the content of minerals e.g. content of magnesium may be adjusted by for example ion exchange methods or another suitable method. Examples of enzymes which may be used for adjustment of sweetness are e.g. glucose isomerase. The main factors affecting enzyme activity are content of minerals, temperature and pH. An increase in temperature increases the rate of reaction up to an optimum that varies from enzyme to enzyme. Above that optimum temperature the enzyme is destroyed.

In the process according to the invention, the cereal extract may further be subjected to a formulation step in which the formulation of the extract is adapted to specific use of the cereal extract, and may e.g. be formulated as a syrup, a powder or a granulate.

In a further aspect of the invention there is provided a cereal-based extract prepared by a method according to the invention.

The cereal extract prepared according to method of the invention is suitable for preparation of food products comprising a cereal-based extract. Cereal extracts are used extensively in the food industry as food additives, e.g. as fillers, flavour enhancers, colouring agents and baking agents. As described above, the haze (or turbidity) of the cereal extract of the invention is remarkably low when dissolved in water, and the cereal extracts of the invention are therefore particularly suitable for the use as a base compound for preparation of beverages such as beer and non-fermented beverages, including soft drinks. In a presently preferred embodiment the cereal extract according to the invention is used for preparing a non-alcoholic beverage. However, it is also contemplated that the cereal extract of the invention may equally well be used in the preparation of alcoholic beverages.

It has been found that the concentrated cereal-based extract according to the invention is very stabile with regards to for example clarity when exposed to heat such as pasteurisation and/or acid such as citric acid making the extract useful in many types of food products such as beverages.

In one aspect the wort used in the process according to the invention is prepared by a method comprising the following steps:
(a) providing a milled cereal material;
(b) suspending the milled cereal in an aqueous liquid and making an aqueous extraction (mashing);
(c) separating the solids and the wort of the resulting suspension;
(d) collecting the wort.

The cereal material is preferably a cereal material that has been milled to a suitable particle size, e.g. to a particle size of from 50 μm to 250 μm e.g. by the use of a hammer mill.

The cereal material may be any suitable cereal, preferably cereal husk or bran, obtained from cereal material selected from barley, wheat, rye, rice, maize, corn, sorghum, oat, spelt, emmer, einkorn, kamut, triticale and buckwheat. In certain embodiments it may be advantageous to use mixtures of such cereal materials.

The cereal-based extracts according to the invention can be prepared from both malted and un-malted cereals, and may in certain useful embodiments be prepared from a mixture of both malted and un-malted cereal material. It is well-known in the art how to produce malted cereal material, and typically includes a process in which cereal material, e.g. rye or barley, is made to germinate by soaking in water under controlled conditions and subsequently dried by kilning (e.g. using hot air). In one aspect, the cereal material is malted barley.

The aqueous liquid in which the milled cereal material is suspended is preferably water but may also be a solution or a suspension of other substances in water. The suspension preferably contains from 2-50% (weight/weight) of milled cereal material, e.g. in the range of 5-10% (weight/weight). This process is generally known as mashing, and may be conducted using a so-called mash tun or mashing kettle for, wherein the natural enzymes of the milled cereal break down the starch into sugars such as maltose and dextrine (saccharification step). The milled cereal material is preferably suspended in the aqueous liquid at a temperature from about 25 to 85 deg. C., including the range of about 35-75. Celsius, also including the range of about 25 to 78 deg. C., also including the range of about 25 to 65 deg. C. The milled cereal material is preferably suspended in the aqueous liquid for a time period of about 60 to 360 minutes, including a time period of about 120 to 300 minutes.

Depending on the selected cereal material, it may in certain embodiments be useful to add enzymes to the suspension of step (b), i.e. the step in which the milled cereal material is suspended in an aqueous liquid. This may in particular be the case when using un-malted cereal material, as such cereal material may contain highly complex polysaccharides which, depending on the final product, needs to be broken down to simpler sugars. However, also when using malted cereal material it may be useful to add enzymes to this step. The traditional malting process, in which e.g. barley is allowed to partially germinate, activates enzymes that break down the complex polysaccharides into simple sugars. However, the process of malting may in certain embodiments not be sufficient for obtaining a final product having the desired properties, and the malting process can be expensive and often difficult to control, and the addition of supplementary enzymes may therefore in certain embodiments be advantageous.

Accordingly, the process according to the invention, may in step (b) further comprise the addition of enzymes, including enzymes selected from proteases, cellulases (EC 3.2.1.4); beta-glucanases, including glucan-1,3 beta-glucosidases (exo-1,3 beta-glucanases, EC 3.2.1.58), 1,4-beta-cellobiohydrolase (EC 3.2.1.91) and endo-1,3(4)-beta-glucanases (EC 3.2.1.6); xylanases, including endo-1,4-beta-xylanases (EC 3.2.1.8) and xylan 1,4-beta-xylosidase (EC 3.2.1.37); pectinases (EC 3.2.1.15); alpha-glucuronidase, alpha-L-arabinofuranosidase (EC 3.2.1.55), acetylesterase (EC 3.1.1.-), acetylxylanesterase (EC 3.1.1.72), alpha amylase (EC 3.2.1.1), beta-amylase (EC 3.2.1.2), glucoamylase (EC 3.2.1.3), pullulanase (EC 3.2.1.41), beta-glucanase (EC 3.2.1.73), hemicellulase, arabinosidase, mannanases including mannan endo-1,4-beta-mannosidase (EC 3.2.1.78) and mannan endo-1,6-alpha-mannosidase (EC 3.2.1.101), pectin hydrolase, polygalacturonase (EC 3.2.1.15), exopolygalacturonase (EC 3.2.1.67) and pectate lyase (EC 4.2.2.10).

In another aspect, depending on the selected cereal material the wort is treated with one or more enzymes before the heat treatment. In one aspect, the wort is treated with one or more proteolytic enzymes before the heat treatment.

The main factors affecting enzyme activity are temperature and pH. An increase in temperature increases the rate of reaction up to an optimum that varies from enzyme to enzyme. Above that optimum temperature the enzyme is destroyed. Individual enzymes also have variable optimum pH ranges. Their activity is optimised within this range, and inhibited at pH values above and below this range. Enzymes will normally be destroyed at pH values far removed from the optimum range. Accordingly, in accordance with the invention step (b) further comprises that the pH of the aqueous liquid is adjusted to the optimum temperature of the added enzymes, e.g. such as to a pH from about 4.0 to 8.0, such as to a pH from about 4.0 to 7.0, including the range of from 4.0 to 6.0, including the range of from 4.5 to 6.5. The pH may be adjusted using a suitable food grade acidulant, including citric acid, malic acid, phosphoric acid, lactic acid and mixtures thereof or sodium hydroxide or CaO and mixtures thereof.

In one aspect, the resulting suspension is subjected to a filtration step, in which the solids and the wort (aqueous-phase) of the resulting suspension are separated. Preferably, this is conducted using traditional separation methods, including a method selected from filtration, centrifugation and sedimentation. The wort (aqueous-phase) is collected using suitable means, e.g. a tank or a vessel.

EMBODIMENTS ACCORDING TO THE INVENTION

Embodiment 1

A method of producing a cereal-based extract comprising the steps of
(a) providing a milled cereal material;
(b) suspending the milled cereal in an aqueous liquid;
(c) separating the solids and the wort (aqueous-phase) of the resulting suspension;
(d) collecting the wort (aqueous-phase);
(e) subjecting the wort (aqueous-phase) to a chilling step;
(f) treating the chilled wort (aqueous-phase) with a stabilisation agent;
(g) subjecting the resulting chilled wort (aqueous-phase) to a clarification step separating the solids from said chilled wort (aqueous-phase);
(h) subjecting the resulting wort (aqueous-phase) to a concentration step, wherein the dry matter content of wort (aqueous-phase) is increased;
(i) collecting the resulting liquid to obtain the cereal-based extract.

Embodiment 2

A method according to embodiment 1, wherein in step (a) the cereal material is selected from the group consisting of barley, wheat, rye, rice, corn, sorghum, oat, spelt, emmer, einkorn, kamut, triticale, buckwheat and mixtures thereof.

Embodiment 3

A method according to embodiment 2, wherein said cereal material is malted cereal, un-malted cereal or a mixture thereof.

Embodiment 4

A method according to embodiment 1, wherein in step (b) the milled cereal is suspended in the aqueous liquid at a temperature from about 25 to 78 deg. C. such as from about 25 to 65 deg. C.

Embodiment 5

A method according to embodiment 1, wherein in step (b) is conducted for a time period of about 120 to 300 minutes.

Embodiment 6

A method according to embodiment 1, wherein step (b) further comprises the addition of enzymes.

Embodiment 7

A method according to embodiment 6, wherein the enzymes are selected from the group consisting of proteases, cellulases (EC 3.2.1.4); beta-glucanases, including glucan-1,3 beta-glucosidases (exo-1,3 beta-glucanases, EC 3.2.1.58), 1,4-beta-cellobiohydrolase (EC 3.2.1.91) and endo-1,3(4)-beta-glucanases (EC 3.2.1.6); xylanases, including endo-1,4-beta-xylanases (EC 3.2.1.8) and xylan 1,4-beta-xylosidase (EC 3.2.1.37); pectinases (EC 3.2.1.15); alpha-glucuronidase, alpha-L-arabinofuranosidase (EC 3.2.1.55), acetylesterase (EC 3.1.1.-), acetylxylanesterase (EC 3.1.1.72), alpha amylase (EC 3.2.1.1), beta-amylase (EC 3.2.1.2), glucoamylase (EC 3.2.1.3), pullulanase (EC 3.2.1.41), beta-glucanase (EC 3.2.1.73), hemicellulase, arabinosidase, mannanases including mannan endo-1,4-beta-mannosidase (EC 3.2.1.78) and mannan endo-1,6-alpha-mannosidase (EC 3.2.1.101), pectin hydrolase, polygalacturonase (EC 3.2.1.15), exopolygalacturonase (EC 3.2.1.67) and pectate lyase (EC 4.2.2.10).

Embodiment 8

A method according to embodiment 1, wherein in step (b) the pH of the aqueous liquid is adjusted to a pH from about 4.0 to 6.0.

Embodiment 9

A method according to embodiment 1, wherein in step (c) the solids and the wort (aqueous-phase) of the resulting suspension are separated by a method selected from filtration, centrifugation and sedimentation.

Embodiment 10

A method according to embodiment 1, wherein in step (e) the wort (aqueous-phase) is treated with a stabilisation agent selected from the group consisting of silica gel preparations (hydrogels, xerogels), silicasol, polyvinylpolypyrrolidone (PVPP), bentonite, gelatine, isinglass, carrageenan, enzymes and mixtures thereof.

Embodiment 11

A method according to embodiment 1, wherein in step (f) the wort (aqueous-phase) treated with a stabilisation agent is chilled to a temperature in the range of about −2 to 15 deg. C., including the range of −2 to 5 deg. C.

Embodiment 12

A method according to embodiment 1, wherein step (d) further comprises a heat treatment of the wort (aqueous-phase).

Embodiment 13

A method according to embodiment 12, wherein said heat treatment comprises increasing the temperature of the wort (aqueous-phase) to at least about 60 deg. C., such as at least about 70 deg. C., such as at least about 80 deg. C., such as at least about 90 deg. C., such as at least about 100 deg. C., such as at least about 110 deg. C., such as at least about 120 deg. C., such as at least about 130 deg. C., including at least about 140 deg. C.

Embodiment 14

A method according to embodiment 12, wherein said heat treatment is conducted for a time period in the range of about 1-120 minutes.

Embodiment 15

A method according to embodiment 1, wherein in step (g) the chilled wort (aqueous-phase) is subjected to a clarification step selected from filtration, centrifugation and sedimentation.

Embodiment 16

A method according to embodiment 15, wherein the sedimentation step is conducted by storing the chilled wort (aqueous-phase) for a time period of at least about 12 hours, including at least 1 day, 2 days, 3 days, 4 days or 5 days.

Embodiment 17

A method according to embodiment 1, wherein in step (h) the wort (aqueous-phase) is concentrated to a dry matter content of at least 30% by weight; such as 40% by weight; such as 50% by weight; such as at least 60% by weight; such as at least 70% by weight; including at least 80% by weight.

Embodiment 18

A method according to embodiment 1, wherein the clarity of the resulting cereal-based extract in step (i) is less than 1.3 EBC at 90° scatter light at 860 nm in a 7 brix solution.

Embodiment 19

A method according to embodiment 1, wherein the resulting cereal-based extract of step (i) is subjecting to a further clarification step.

Embodiment 20

A method according to embodiment 19, wherein the further clarification step is conducted by a process selected from filtration, centrifugation and sedimentation.

Embodiment 21

A method according to embodiment 20, wherein said clarification step is a hot filtration step.

Embodiment 22

A method according to embodiment 1, wherein the resulting cereal-based extract of step (i) is subjecting to a further concentration step.

Embodiment 23

A method according to embodiment 22, wherein the cereal-based extract subjected to a further concentration step is formulated as a syrup, a powder or a granulate.

Embodiment 24

A cereal-based extract prepared by a method according to any of embodiments 1-23.

Embodiment 25

A food product comprising a cereal-based extract prepared by a method according to any of embodiments 1-23.

Embodiment 26

A food product according to embodiment 25, wherein the food product is a beverage.

Embodiment 27

A food product according to embodiment 26, wherein the beverage is a non-alcoholic beverage.

EXAMPLES

Example 1

Malt Barley

Grist containing 100% milled barley malt was mixed with water in a ratio of 5.3 hl of water per 100 kg of malt at a temperature of 36-40° C. The extraction process took place using a temperature profile in a temperature range of 36° C. to 78° C. for 180 to 220 minutes.

The water malt slurry was filtered by means of a Lauter Tun and transferred into a wort kettle. Silicasol (manufactured by Stabifix Brauerei-Technik, Germany) was added to the boiling barley malt extract. The barley malt extract was subsequently subjected to a heat treatment at 95° C. to 100° C. for 60 to 90 minutes.

Afterwards the barley malt extract was chilled to 10° C. and clarified using a centrifuge. Bentonite (manufactured by Stabifix Brauerei-Technik, Germany) was added to the clarified barley malt extract during transfer to a storage tank. After transfer the product was stored at 0 to 2° C. for 48 hours in order to allow for sedimentation of particulate matter. When the sedimentation process was completed, the sediment was separated from the barley malt extract, and the resulting barley malt extract was subjected to a filtration process using kieselguhr filtration. Finally, the barley malt extract was evaporated to a dry matter content of 60-67% weight/weight.

The resulting malt extract concentrate was stored for 2 days at 15° C. allowing for sedimentation of remaining particulate matter. Following the sedimentation, the malt extract concentrate was filtered using kieselguhr filtration at 65 to 75° C. The haze value of the final malt extract concentrate was measured by a Haffmans turbidity meter according to the manufactures protocol (Manufactured Haffmans, Germany) in a 7 brix solution. The final malt extract concentrate had a haze value of 0.5 EBC when measure at a 7 brix dilution as described above.

Example 2

Unmalted Barley

Grist containing 100% milled unmalted barley was mixed with water in a ratio of 5.3 hl of water per 100 kg of barley malt at a temperature of 50-55° C. The extraction process took place using a temperature profile in a temperature range of 50° C. to 78° C. for 120 to 180 minutes.

The water malt slurry was filtered by means of a mash filter and transferred into a wort kettle. Silicasol (manufactured by Stabifix Brauerei-Technik, Germany) was added to the boiling wort. The wort was subsequently subjected to a heat treatment at 95° C. to 100° C. for 60 to 90 minutes with following separation in the whirlpool.

Afterwards the wort was chilled to 10° C. and clarified using a centrifuge. Bentonite (manufactured by Stabifix Brauerei-Technik, Germany) was added to the clarified wort during transfer to a storage tank. After transfer the product was stored at 0 to 2° C. for 72 hours in order to allow for sedimentation of particulate matter. When the sedimentation process was completed, the sediment was separated from the wort, and the resulting wort was subjected to a filtration process using kieselguhr filtration. Finally, the wort was evaporated to a dry matter content of 60-67% weight/weight.

The resulting malt extract concentrate was stored for 2 days at 15° C. allowing for sedimentation of remaining particulate matter. Following the sedimentation, the barley malt extract concentrate was filtered using kieselguhr filtration at 65 to 75° C. The haze value of the final malt extract concentrate was measured by a Haffmans turbidity meter according to the manufactures protocol (Manufactured Haffmans, Germany) in a 7 brix solution. The final malt extract concentrate had a haze value of 0.5 EBC when measure at a 7 brix dilution as described above.

Example 3

In order to improve the cold stabilisation step, six different stabilisation agents were tested in order to evaluate which of the agents had the biggest positive impact on the clarity of the final malt extract concentrate.

Barley malt extract was prepared using the mashing and hot stabilization steps described in Example 1. The barley malt extract was subsequently chilled to 10° C. and clarified using a centrifuge. The barley malt extract was split into 7 different samples which during cold stabilization were treated with following stabilization agents at concentrations indicated: (1) 0.4 g/L stabisol, (2) 0.5 g/L bentonite, (3) 0.2 g/L PVPP, (4) 0.8 g/L xerogel (manufactured Stabifix Brauerei-Technik, Germany), (5) combination of 0.4 g/L stabisol, 0.2 g/L PVPP, 0.8 g/L xerogel and 0.5 g/L gelatine, (6) 0.5 g/L gelatine. The last sample (7) was not treated with any stabilization agent and was used as reference sample.

During the cold stabilization step, the barley malt extract samples were stored at 0 to 2° C. for 48 hours. When the sedimentation process was completed the sediment was removed and the barley malt extract was filtered using kieselguhr filtration and evaporated to a dry matter content of 60-67% weight/weight.

Figure 1:
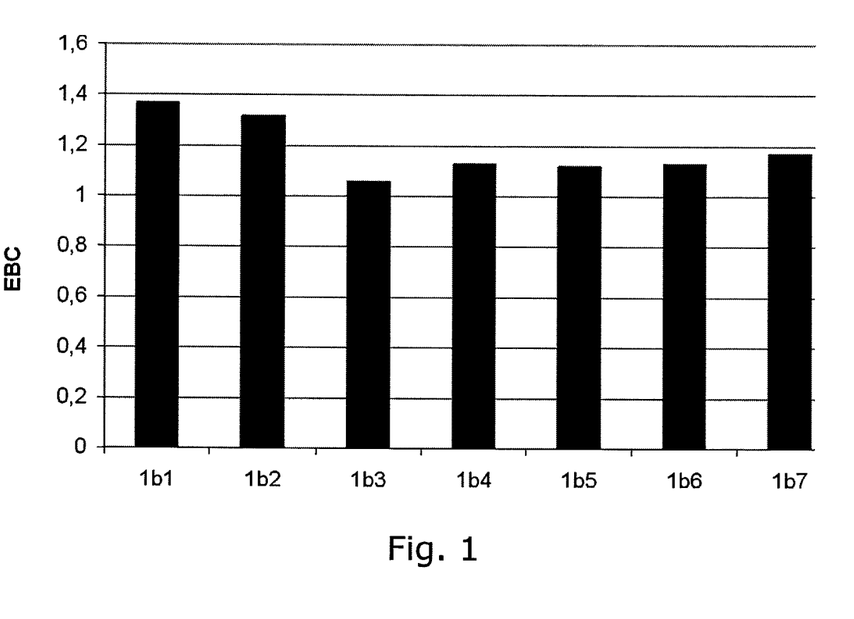
FIG. 1 shows results from example 3 where six different stabilisation agents were tested in order to evaluate which of the agents had the biggest positive impact on the clarity of the final malt extract concentrate.

The clarity of the resulting malt extract concentrate was measured using a Haffmans Turbidity meter according to the manufactures protocol (Manufactured by Haffmans, Germany) in a 7 brix solution. The final malt extract concentrate had a haze value of 0.05 EBC when diluted in water and measured at a 7 brix solutions described above. The variance between the clarity of the different samples is illustrated in FIG. 1.

Using sample 7 as the reference sample, it was possible to see the positive impact of the different stabilization agents. All samples containing stabilisation agent had a clarity below the visual detectable 2 EBC.

The final application of the extract is decisive for which stabilization agent that is to be used. Hence, the results of the clarity tests may therefore be used as guidelines as to which stabilization agent there is needed to obtain the desired clarity for the final application.

Example 4

The combination and function of two different stabilization agents were tested during a hot stabilization step in order to see which agent had the most positive impact on the clarity of the final malt extract concentrate.

Barley malt extract is prepared by using the procedure described in Example 1. The water malt slurry obtained during mashing was filtered by means of Lauter Tun and split into four different samples which were transferred separately into a wort kettle and treated with stabilization agents as follows:

1a. 0.4 g/L stabisol (silicic acid hydrosol manufactured by Stabifix Brauerei-Technik, Germany) added before boiling and 0.2 g/L PVPP (polyvinylpolypyrrolidone manufactured by Stabifix Brauerei-Technik, Germany) and 0.2 g/L Stabiquick NT (manufactured by Stabifix Brauerei-Technik, Germany) 10 minutes before end boiling.
1b. 0.4 g/L stabisol added before boiling.
2a. 0.2 g/L PVPP and 0.2 g/L Stabiquick NT 10 minutes before end boiling.
2b. reference sample made without stabilization agents.

The heat treatment took place at 95° C. to 100° C. for 90 minutes. The clarity of the resulting barley malt extract was tested by measuring the haze in a 7 brix solution at 90° EBC using a Turbidity Meter as described above in Example 2.

Figure 2:
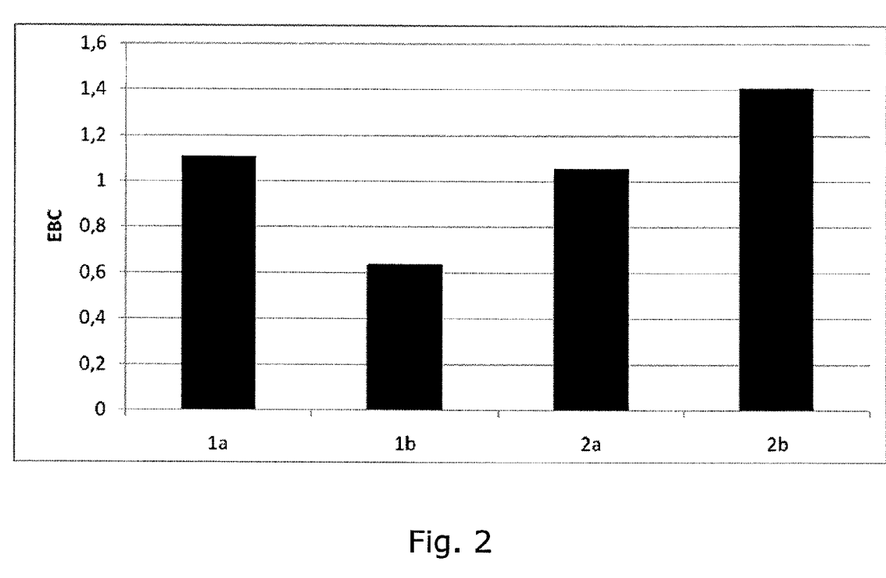
FIG. 2 shows results from example 4 where a the combination and function of two different stabilization agents were tested during a hot stabilization step in order to see which agent had the most positive impact on the clarity of the final malt extract concentrate.

The results from this experiment are illustrated in FIG. 2.

The positive impact of the different stabilization agents is clearly illustrated in this test. As can be seen from FIG. 2, sample 1b shows the best result of the tested stabilization agents and combinations.

Example 5

Clear Barley Malt Extract with Sweet Taste

Grist containing 100% milled unmalted barley was mixed with water in a ratio of 5.3 hl of water per 100 kg of barley malt at a temperature of 50-55° C. The extraction process took place using a temperature profile in a temperature range of 50° C. to 78° C. for 120 to 180 minutes.

The water malt slurry was filtered by means of a mash filter and transferred into a wort kettle. Silicasol (manufactured by Stabifix Brauerei-Technik, Germany) was added to the boiling wort. The wort was subsequently subjected to a heat treatment at 95° C. to 100° C. for 60 to 90 minutes with following separation in the whirlpool.

The pH was adjusted after boiling to pH 7.0-8.0 by adding CaO. After adjustment of the pH, the wort was bobbled with $CO_2$ in order to reduce the calcium content of the wort.

Afterwards the wort was chilled to 10° C. and solids were removed by centrifugation. The wort was following filtrated by ultrafiltration on a UF filter from GEA, Germany. The clarified wort was treated by 2 step ion-exchange. First step was a softening of the wort by lowering the calcium content. The agent used was a gel polystyrene sulphonate cation exchange resin from Purolite. The second step was a decolourization by using the resin macroporous poly(vinylbenzyltrimethylammonium) exchanger from Purolite.

Finally the wort was evaporated to a dry matter content of 60-67% weight/weight.

The concentrated malt extract was treated with Sweetzyme from Novozymes A/S, Denmark developed to convert glucose into fructose in an amount suitable for converting a maximum of 44% glucose into fructose. The magnesium content was standardized by adding $MgSO_4$. The pH was standardized by addition of sodium hydroxide to 7.0-8.0.

The resulting malt extract concentrate was stored for 2 days at 15° C. allowing for sedimentation of remaining particulate matter. Following the sedimentation, the barley malt extract concentrate was filtered using kieselguhr filtration. The haze value of the final malt extract concentrate was measured by a Haffmans turbidity meter according to the manufactures protocol (Manufactured Haffmans, Germany) in a 7 brix solution. The final malt extract concentrate had a haze value of 0.5 EBC when measure at a 7 brix dilution as described above.

Example 6

Production of Malt Beverage with Flavour

The clear barley malt extract may be used for production of different types of malt beverages. In one application the following ingredients is added to the clear barley malt extract:
Ingredients
  Water
  Crystal sugar, Nordic Sugar, Sweeden
  Citric acid, Einar Willumsen, Denmark
  Natural flavour for example lemon flavour from Symrise, Nördlingen, Germany The ingredients are mixed in a mixing tank and the flavour, brix and pH of the solution is adjusted to the following:
  Brix: 10-13
  pH 3.5-4.5
  Flavour: Nice taste of fresh lemon Following the adjustments the malt beverages is filled in cans in a filling line from for example Krones AG. After filling the malt beverages into the cans the product is pasteurized in a tunnel pasteurizer and following cooled down.

The product is after production tested for haze (clarity) which preferably should be below 1 EBC.

The invention claimed is:

1. A method of producing a non-fermented, non-alcoholic haze-free malt beverage comprising the following steps performed in the following order:
  (i) subjecting a wort to a heat treatment with a stabilisation agent;
  (ii) subjecting the heat-treated wort to a cold stabilisation step, wherein the wort is chilled and the solids from said chilled wort are separated to obtain a clarified wort;
  (iii) subjecting the clarified wort to a concentration step, wherein the dry matter content of the wort is increased to a dry matter content of at least 30% by weight to obtain a concentrate;
  (iv) subjecting the concentrate to a hot filtration step at a temperature in the range of about 30-90° C. to obtain the concentrated cereal-based extract; and
  (v) reconstituting the concentrated cereal-based extract with water to obtain a non-fermented, non-alcoholic haze-free malt beverage.

2. The method according claim 1, wherein said heat treatment comprises increasing the temperature of the wort to at least about 60 deg. Celsius.

3. The method according to claim 1, wherein said stabilisation agent is selected from the group consisting of silica gel preparations, hydrogels, xerogels, silicasol, polyvinylpolypyrrolidone (PVPP), bentonite, gelatine, isinglass, carrageenan and mixtures thereof.

4. The method according to claim 1, wherein the cold stabilisation step comprises the following steps:
  subjecting the wort to a chilling step;
  subjecting the chilled wort to centrifugation and/or filtration;
  optionally subjecting the resulting wort to a second chilling step;
  treating the chilled wort with a stabilisation agent;
  subjecting the resulting chilled wort to a clarification step separating the solids from said chilled wort by sedimentation.

5. The method according to claim 4, wherein the wort is chilled to a temperature in the range of about −2 to 15 deg. Celcius.

6. The method according to claim 1, wherein the cold stabilisation step comprises the following steps:
  subjecting the wort to a chilling step;
  subjecting the resulting chilled wort to a clarification step separating the solids from said chilled wort by ultrafiltration.

7. The method according to claim 6, wherein the wort is chilled to a temperature in the range of about −2 to 10 deg. Celcius.

8. The method according to claim 1, wherein the clarified wort is treated by ion-exchange before the concentration step.

9. The method of claim 1, wherein said concentrated cereal-based extract is produced by a method comprising the steps of:
  subjecting a wort to the heat treatment with a stabilisation agent;
  optionally adjusting the pH of the heat-treated wort;
  subjecting the heat-treated wort to a chilling step;
  subjecting the chilled wort to centrifugation and/or filtration;
  optionally subjecting the resulting wort to a second chilling step;
  treating the chilled wort with a stabilisation agent;
  subjecting the resulting chilled wort to a clarification step separating the solids from said chilled wort by sedimentation;
  removing the sedimented material to obtain a clarified wort;
  treating the clarified wort by centrifugation and/or filtration, optionally with a filtration agent;
  subjecting the resulting wort to a concentration step, wherein the dry matter content of wort is increased and collecting the resulting concentrate;
  subjecting the concentrate to a hot filtration step to obtain the concentrated cereal-based extract.

10. The method of claim 1, wherein said concentrated cereal-based extract is produced by a method comprising the steps of:
  subjecting the wort to a heat treatment with a stabilisation agent;
  optionally adjusting the pH of the heat-treated wort;
  subjecting the heat-treated wort to a chilling step;
  subjecting the chilled wort to centrifugation and/or filtration;
  subjecting the resulting chilled wort to a clarification step separating the solids from said chilled wort by ultrafiltration;
  subjecting the ultrafiltrated wort to one or more ion-exchange steps;
  subjecting the resulting wort to a concentration step, wherein the dry matter content of wort is increased and collecting the resulting concentrate;
  optionally adjusting the concentrate for sweetness by enzyme treatment;
  subjecting the concentrate to a hot filtration step to obtain the concentrated cereal-based extract.

11. The method according to claim 9, wherein the wort is concentrated to a dry matter content of at least 30% by weight.

12. The method according to claim 1, wherein the clarity of the resulting concentrated cereal-based extract is less than 1.3 EBC at 90° scatter light at 860 nm in a 7 brix solution.

13. The method according to claim 1, wherein the concentrated cereal-based extract is adjusted for sweetness by adding an enzyme.

14. The method according to claim 1, wherein the wort is treated with one or more proteolytic enzymes before the heat treatment.

15. The method according to claim 1, wherein the method prior to the heat treatment comprises the following steps:
  (a) providing a milled cereal material;
  (b) suspending the milled cereal in an aqueous liquid and making an aqueous extraction (mashing);
  (c) separating the solids and the wort of the resulting suspension;
  (d) collecting the wort.

16. The method according to claim 15, wherein said cereal material is malted cereal, un-malted cereal or a mixture thereof.

17. The method according to claim 15, wherein in step (b) the milled cereal is suspended in the aqueous liquid at a temperature from about 25 to 65 deg. Celsius.

18. The method according to claim 15, wherein step (b) further comprises the addition of enzymes.

19. A method of producing a non-fermented, non-alcoholic haze-free malt beverage, said method comprising the step of reconstituting a concentrated cereal-based extract with water to obtain a non-fermented, non-alcoholic haze-free malt beverage, wherein said concentrated cereal-based extract has been produced by the following steps performed in the following order:
  (i) subjecting a wort to a heat treatment with a stabilisation agent;
  (ii) subjecting the heat-treated wort to a cold stabilisation step, wherein the wort is chilled and the solids from said chilled wort are separated to obtain a clarified wort;
  (iii) subjecting the clarified wort to a concentration step, wherein the dry matter content of the wort is increased to a dry matter content of at least 30% by weight to obtain a concentrate; and
  (iv) subjecting the concentrate to a hot filtration step at a temperature in the range of 30-90° C. to obtain a concentrated cereal-based extract.

* * * * *

UNITED STATES PATENT AND TRADEMARK OFFICE
CERTIFICATE OF CORRECTION

PATENT NO. : 9,173,429 B2  
APPLICATION NO. : 12/999216  
DATED : November 3, 2015  
INVENTOR(S) : Bernhard Griese Page 1 of 1

It is certified that error appears in the above-identified patent and that said Letters Patent is hereby corrected as shown below:

On the title page

Item (87) should read    PCT Pub. No.: WO2010/092149  
                                   PCT Pub. Date: Aug. 19, 2010

Item (30) should read                Foreign Application Priority Data  
Feb. 13, 2009                (DK)………………………………….PA 2009 00212

Signed and Sealed this  
Ninth Day of August, 2016

Michelle K. Lee  
*Director of the United States Patent and Trademark Office*